United States Patent [19]

Bensel

[11] Patent Number: 4,922,616
[45] Date of Patent: May 8, 1990

[54] INDUSTRIAL SAW GUIDE ATTACHMENT

[76] Inventor: Oskar Bensel, 8652 Wellington St., Ventura, Calif. 93004

[21] Appl. No.: 268,061

[22] Filed: Nov. 7, 1988

[51] Int. Cl.$^5$ ............................................. B23D 51/02
[52] U.S. Cl. ........................................ 30/374; 83/745
[58] Field of Search ................. 30/371, 372, 373, 374, 30/392, 393, 394; 83/574, 745, 758, 761, 762, 821, 829, 441.1

[56] References Cited
U.S. PATENT DOCUMENTS

| | | | |
|---|---|---|---|
| 2,783,793 | 5/1957 | Prince | 83/441.1 |
| 2,866,485 | 12/1958 | Anton | 30/374 |
| 3,303,861 | 2/1967 | Kane | 83/441.1 X |
| 3,414,028 | 12/1968 | McManama | 83/27 |
| 3,991,643 | 11/1976 | Girardin | 83/564 |
| 4,016,649 | 4/1977 | Kloster | 30/373 |
| 4,489,634 | 12/1984 | Volk | 83/522 |
| 4,628,608 | 12/1986 | Kuhlmann et al. | 30/373 |
| 4,751,865 | 6/1988 | Buckalew | 83/745 |

Primary Examiner—Frank T. Yost
Assistant Examiner—Eugenia A. Jones
Attorney, Agent, or Firm—Leon Gilden

[57] ABSTRACT

The instant invention sets forth a saw guide for use with industrial type saws to enable the use of such saws in a jig saw arrangement. A plurality of upstanding legs are securable to an associated industrial saw wherein the legs are spaced to either side of elongate underlying slot for enabling reciprocation of a saw blade within said slot. The slot terminates in a spaced "V" shaped configuration to minimize hindrance of movement of the saw guide and saw during traverse over a surface to be cut accommodating imperfections associated with a surface to be traversed. A manipulating handle is positioned in a raised orientation relative to a first guide surface with an adjustable second guide orthogonally and adjustably positionable relative to said first guide surface.

1 Claim, 1 Drawing Sheet

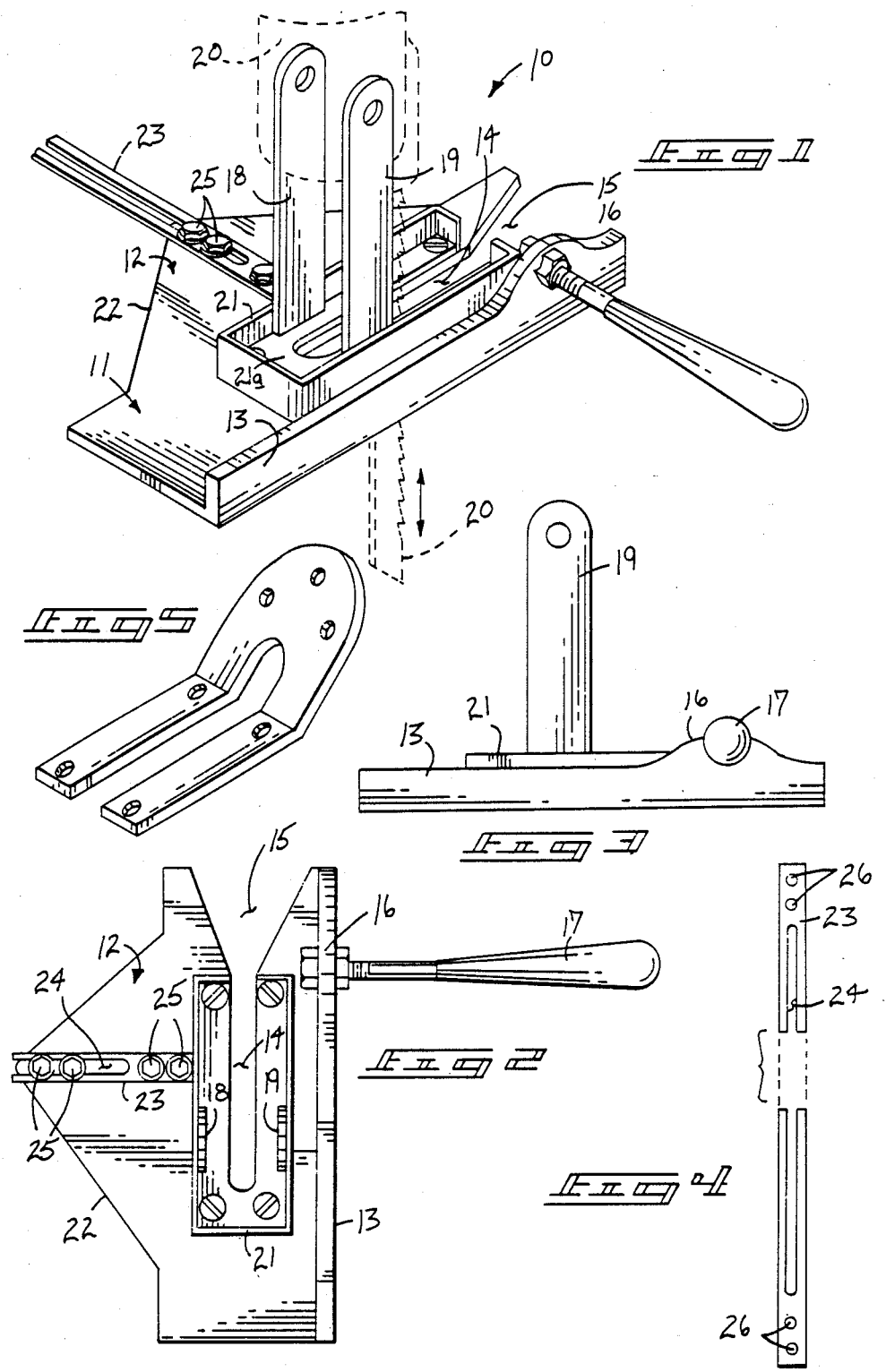

INDUSTRIAL SAW GUIDE ATTACHMENT

BACKGROUND OF THE INVENTION

1. Field of the Invention

The field of invention relates to saw guides, and more particularly pertains to a new and improved saw guide attachment for use in combination with industrial type saws to enable use of such saws in a jig saw orientation.

2. Description of the Prior Art

The use of saw guides is well known in the prior art. As may be appreciated, saw guides have generally been for use in combination with conventional jig saw arrangements wherein the invention sets forth a saw guide for use with industrial type saws enabling the cutting of complex cutting patterns in use with industrial type saw.

Prior art examples of saw guides are to be found in prior art patents as exemplified by U.S. Pat. No. 2,783,793 to Prince setting forth a saw guide for use with a band saw wherein the saw guide provides an elongate slot for enabling reciprocation of said saw, but fails to set forth the compactness and simplicity of construction of the instant invention as related to industrial type portable saws.

U.S. Pat. No. 3,414,028 to McNanama sets forth a further example of a band saw guide which may be attached to a base or supporting standard for adjustment angularly relative to the saw blade or laterally relative thereto to provide erosion alignment of the saw blade during use.

U.S. Pat. No. 3,991,643 to Girardin sets forth the use of a saw guide in combination with a circular saw that is formed with elongate track member that secures a positionable slider therein for adjustment of the circular saw thereto. The Girardin patent is of interest relative to a variation development of saw guides, but is of a relatively remote organization to that of the instant invention.

U.S. Pat. No. 4,489,634 to Volk sets forth a saw guide for use in combination with a conventional sabre saw wherein a protractor and securement arrangement enables positioning of the saw guide relative to the saw, as desired, and is of interest relative to a further example of saw guide construction.

As such, however, it may be appreciated that there is a continuing need for a new and improved saw guide that may be used in combination with industrial-type saws to expand the versatility and effectiveness of such saws when traversing planar cutting surfaces and in this respect, the present invention substantially fulfills this need.

SUMMARY OF THE INVENTION

In view of the foregoing disadvantages inherent in the known types of saw guides now present in the prior art, the present invention provides an industrial saw guide attachment wherein the same may be compactly and efficiently secured to an industrial-type saw for enabling use of said saw in a jig saw arrangement for the cutting of complex patterns within a planar surface. As such, the general purpose of the present invention, which will be described subsequently in greater detail, is to provide a new and improved industrial saw guide attachment which has all the advantages of the prior art saw guides and none of the disadvantages.

To attain this, the present invention comprises a saw guide formed with a planar surface formed with a notched recess for slidingly receiving a guide therewithin for positioning said saw guide at a desired distance relative to an edge or vertical surface to be cut. A second guide is orthogonally positioned on the saw guide attachment on an opposed end to that of the spaced guide to provide a vertical guide surface formed with an associatable handle overlying and integrally formed to a boss overlying said guide surface. A plurality of upstanding ears are provided for securing the saw guide to industrial-type saw spaced to either side of an associated elongated notch terminating in a "V" shaped configuration for minimizing hindrance of the saw guide as it contacts imperfection in a board surface to be cut.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved industrial saw guide attachment which has all the advantages of the prior art saw guides and none of the disadvantages.

It is another object of the present invention to provide a new and improved industrial saw guide attachment which may be easily and efficiently manufactured and marketed.

It is a further object of the present invention to provide a new and improved industrial saw guide attachment which is of a durable and reliable construction.

An even further object of the present invention is to provide a new and improved industrial saw guide attachment which is susceptible of a low cost of manufacture with regard to both materials and labor, and which accordingly is then susceptible of low prices of sale to the consuming public, thereby making such industrial saw guide attachment economically available to the buying public.

Still yet another object of the present invention is to provide a new and improved industrial saw guide attachment which provides in the apparatuses and methods of the prior art some of the advantages thereof, while simultaneously overcoming some of the disadvantages normally associated therewith.

Still another object of the present invention is to provide a new and improved industrial saw guide attachment which may be efficiently and effectively secured to an industrial-type saw to enable use of said saw in a jig saw arrangement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is top orthographic view of the instant invention.

FIG. 3 is an orthographic side view of the instant invention taken in elevation.

FIG. 4 is a top orthographic view of positioning guide in use in combination with the instant invention.

FIG. 5 is an isometric illustration of a modified foot for use with the instant invention.

DESCRIPTION OF THE PREFERRED EMBODIMENT

With reference now to the drawings, and in particular to FIGS. 1 to 4 thereof, a new and improved industrial saw guide attachment embodying the principles and concepts of the present invention and generally designated by the reference numeral 10 will be described.

More specifically, it will be noted that industrial saw guide attachment 10 of the instant invention includes a planar support base 11 formed with a top surface 12. The top surface 12 terminates along one edge in a linear elongate first vertical guide surface 13 projecting orthogonally upwardly to the top surface 12 and formed with a raised boss portion 16 for selective attachment of handle 17 thereto. The raised boss is required to effect clearance of the guide 13 upon positioning of the first guide surface 13 against a guide board to enable parallel cuts in use of the apparatus. The first guide surface is oriented and arranged parallel to an elongate cutting groove 14 that terminates in a "V" entrance 15. The spaced legs of the "V" shaped entrance more readily accommodate imperfections as the saw guide attachment 10 when traversed about a surface to be cut and renders the apparatus less prone to deflection upon encountering such imperfections. Orthogonally integrally secured to the top surface 12 are a first and second leg 18 and 19 positioned on either side of the elongate groove 14 and formed with openings for securement of an associated industrial saw 20. Industrial saws of this class are commercially sold under the name SawZall (T.M.) or Milwakee (T.M.). An upstanding perimeter flange 21 is integrally formed to the top surface 12 and rigidly secures therewith the first and second legs 18 and 19 of a securement foot 21a for a Milwakee (T.M.) type saw, and further provides integrity to the organization terminating in a pair of parallel spaced ends aligned with the elongate cutting groove 14.

FIG. 5 illustrates a replacement foot for the foot 21a for securement within perimeter flange 21 to provide securement for a SawZall (T.M.) type saw.

A triangular projection formed on the top surface 12 on the opposite end of the top surface, opposed to the first guide surface 13, is a triangular projection 22 for accommodating a positioning guide 23 thereon. The positioning guide is formed with an elongate slot 24 formed in alignment with paired openings 26 at either end for adjustable securement of the guide 23 along the triangular projection 22. A plurality of pairs of threaded openings 26 enable fixed and adjustable securement of the positioning guide 23 along the surface of triangular projection 22 orthogonally relative to the first guide 13. The guide 23 enables desired spacing and parallelism relative to the elongate cutting groove 14.

It should be further noted that the upstanding perimeter flange 21 accommodates a predetermined amount of sawdust accumulation during a cutting operation to enhance visibility during such a procedure.

As such, the use and operation of the instant invention should be apparent from the above disclosure and accordingly, no further discussion relative to the manner of usage and operation of the instant invention will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A saw guide apparatus for selective securement of an elongate portable reciprocating saw thereto, said apparatus comprising,
    an elongate planar saw guide plate including a top surface and a bottom surface and defining by a forward edge spaced from a rear edge, a right edge spaced from a left side edge, and formed with an elongate cutting groove terminating in an open end defining a "V" shaped opening directed through said forward edge,
    said portable reciprocating saw securable between a plurality of upstanding legs integrally and orthogonally formed to a foot member removably secured on the top surface of said planar saw guide plate, and
    a first planar vertical guide projecting orthogonally upwardly of said upper surface at the right side thereof including a removably securable handle for guiding said saw guide apparatus about a surface to be cut, and wherein said first vertical guide defines a first planar surface parallel and spaced from said elongate cutting groove, and wherein said first vertical guide includes a linear upper edge surface and further includes an integrally formed upstanding boss portion projecting above the upper edge surface for acceptance of the removably securable handle thereto wherein said handle projects orthogonally relative to said boss portion and said first guide, and including a positioning guide securable to the top surface projecting exteriorly of the left side edge wherein the left side edge includes a triangular projection and wherein the positioning guide overlies an apex defined by the triangular projection and wherein the positioning guide is oriented orthogonally relative to the first planar surface wherein the triangular projection enhances stability of the planar saw guide plate and the positioning guide, and wherein said positioning guide includes an elongate slot aligned with a plurality of spaced opening pairs for acceptance of fastening means to adjustably fasten said positioning guide to said top surface, and wherein the foot member includes a surrounding perimeter flange integrally and orthogonally formed to the foot member in surrounding relationship to said elongate cutting groove and said foot member and said perimeter flange terminating in an opening aligned with said groove wherein said perimeter flange defines an accumulation portion for accepting accumulation of sawdust therein during a cutting procedure to enhance visibility during said procedure, and the perimeter flange and foot member positioned on the top surface spaced from the forward edge, rear edge, right side edge and left side edge.

* * * * *